United States Patent [19]
Nielinger et al.

[11] Patent Number: 4,550,133
[45] Date of Patent: Oct. 29, 1985

[54] STABILIZED RED PHOSPHORUS AND ITS USE FOR FLAMEPROOFING THERMOPLASTIC POLYAMIDE MOULDING COMPOSITIONS

[75] Inventors: Werner Nielinger; Karl H. Hermann; Dietrich Michael, all of Krefeld, Fed. Rep. of Germany

[73] Assignee: Bayer Aktiengesellschaft, Leverkusen, Fed. Rep. of Germany

[21] Appl. No.: 608,145

[22] Filed: May 8, 1984

[30] Foreign Application Priority Data

May 17, 1983 [DE] Fed. Rep. of Germany ....... 3317822

[51] Int. Cl.$^4$ ............................ C08K 3/32; C08K 3/02
[52] U.S. Cl. ................................... 524/399; 524/414; 524/704; 252/400 R; 252/400 A; 260/DIG. 24
[58] Field of Search .......... 252/400 A, 400 R, 400.53; 524/399, 414, 704; 260/DIG. 24

[56] References Cited

U.S. PATENT DOCUMENTS

| 3,305,568 | 2/1967  | Klemchuk      | 524/399 |
| 3,778,407 | 12/1973 | Hild et al.   | 524/414 |
| 3,883,475 | 5/1975  | Racky et al.  | 524/414 |
| 4,105,735 | 8/1978  | Dany et al.   | 524/414 |
| 4,187,207 | 2/1980  | Cerny et al.  |         |
| 4,237,034 | 12/1980 | Tomka et al.  | 524/399 |
| 4,242,240 | 12/1980 | Cerny et al.  |         |
| 4,402,858 | 9/1983  | Capolpo et al.| 524/399 |

FOREIGN PATENT DOCUMENTS

| 0006549 | 6/1978  | European Pat. Off. . |
| 1543511 | 4/1979  | United Kingdom .    |
| 1577587 | 10/1980 | United Kingdom .    |
| 1592813 | 7/1981  | United Kingdom .    |

*Primary Examiner*—John Kight
*Assistant Examiner*—Kriellion Morgan
*Attorney, Agent, or Firm*—Connolly and Hutz

[57] ABSTRACT

Red phosphorus stabilized with cadmium salts of carboxylic acids is suitable for use as a flameproofing agent for polyamide moulding compositions.

10 Claims, No Drawings

STABILIZED RED PHOSPHORUS AND ITS USE FOR FLAMEPROOFING THERMOPLASTIC POLYAMIDE MOULDING COMPOSITIONS

This invention relates to thermoplastic polyamide moulding compositions which are flameproofed with red phosphorus and cadmium salts of carboxylic acids.

The use of red phosphorus as a flameproofing agent for thermoplastic polyamides is known. Under adverse conditions, particularly at elevated temperatures, such as may have to be applied in the production and processing of the phosphorus-containing thermoplastics, or in the presence of moisture, red phosphorus tends to decompose into hydrogen phosphide and acids of 1- to 5-valent phosphorus. Accordingly, attempts have already been made to prevent the release of the toxic hydrogen phosphide. According to DOS No. 23 08 104, this is done by the addition of metal oxides or, according to DOS No. 27 03 052 by the addition of magnesium or aluminium salts of a chelateforming aminoacetic acid. In addition, the phosphorus may be stabilized by coating with binders, such as waxes or metal soaps (DOS No. 24 08 488) or polymers, such as phenol-formaldehyde resins (DAS No. 26 25 673, DOS No. 27 34 103) and polyesters (DOS No. 27 54 515). According to DAS No. 27 45 076, cadmium oxide has proved to be a particularly suitable additive for coated phosphorus (GB-PS No. 1.543.511). In contrast to the products stabilized with copper oxide, it leads to polyamides having improved arc resistance. According to another proposal (DOS No. 28 27 760), aluminium, magnesium, zinc, calcium, tin, lead or antimony salts of polymers containing carboxyl groups may also be used for stabilization. However, such products are difficult and expensive to produce, in addition to which their stabilizing effect is not always satisfactory.

It has now been found that red phosphorus can be excellently stabilized with cadmium salts of carboxylic acids so that the disadvantages referred to previously are avoided. Thus, for example, the formation of hydrogen phosphide both during production and also during processing of the stabilized polyamides is negligible.

The fact that the formation of hydrogen phosphide is prevented in accordance with the invention is surprising because, on their own, carboxylic acids promote the elimination of hydrogen phosphide. In addition, the effect of the cadmium salts of carboxylic acids is surprisingly better than that of cadmium oxide on its own because cadmium salts can be used in smaller quantities than cadmium oxide to obtain equally effective stabilization.

Accordingly, the present invention provides powder-form, stabilized red phosphorus which is stabilized against thermo-oxidative decomposition with cadmium salts of carboxylic acids and which is eminently suitable for use as a flameproofing agent for thermoplastic polymides.

Adequate stabilization is obtained with from 1 to 30% by weight and preferably from 3 to 25% by weight of cadmium salts, based on red phosphorus.

The stabilizers may either be mechanically mixed with the red phosphorus powder or, where they are produced in the presence of a phosphorus suspension, they may be precipitated onto the phosphorus particles. It is also possible directly to add the stabilizers to the melt during incorporation of the phosphorus into the thermoplastic material.

The red phosphorus used for flameproofing should have an average particle size of $<200$ µm and preferably of $<100$ µm.

The present invention also provides thermoplastic polyamide moulding compositions containing red phosphorus as flameproofing agent and from 0.01 to 5% by weight and preferably from 0.05 to 3% by weight, based on the total moulding compostion, of a cadmium salt of at least one carboxylic acid as stabilizer.

Preferred stabilizers are the cadmium salts of aliphatic, preferably $C_2-C_{20}$ and, more preferably, $C_3-C_{18}$, cycloaliphatic, preferably $C_6-C_{20}$ and, more preferably, $C_7-C_{17}$ or aromatic, preferably $C_7-C_{20}$ and, more preferably, $C_7-C_{16}$ carboxylic acids, preferably dicarboxylic acids.

The cadmium salts of oxalic acid, malonic acid, succinic acid, adipic acid, azelaic acid, sebacic acid, phthalic acid, benzoic acid, acetic acid, propionic acid, stearic acid, are mentioned as examples of suitable stabilizers.

It is preferred to use the salts of the dicarboxylic acids, particularly cadmium oxalate and cadmium adipate. The salts are produced by reacting a cadmium compound, such as cadmium acetate, carbonate, chloride or sulfate, with the mono- or dicarboxylic acids in water or in a suitable solvent.

The red phosphorus is added in amounts of from 1 to 16% by weight and preferably from 2–12% by weight, based on the total moulding composition.

The polyamides in question are, in particular, aliphatic polyamides, such as polycaprolactam, polyhexamethylene adipic acid amide, polyaminoundecanoic amide and polylauric lactam, also homo- and copolyamides of dicarboxylic acids, such as adipic acid, azelaic acid, sebacic acid, decane dicarboxylic acid, terephthalic acid isophthalic acid, and diamines, such as hexamethylene diamine, trimethyl hexamethylene diamine, bis-(4-aminocyclohexyl)-methane, bis-(4-aminocyclohexyl)-2,2-propane and also copolymers of these monomers with lactams. The flameproofing composition according to the invention is preferably applied to polyamide-6 and/or polyamide-6,6.

The thermoplastic polyamide moulding compositions according to the invention are produced by mixing the components in standard extruders or kneaders. To this end, the flameproofing agent stabilized as previously described may be incorporated in the thermoplast directly or in the form of a concentration in thermoplasts. It is also possible separately to process the red phosphorus and the stabilizer to form a thermoplast concentrate or directly to introduce the two components separately into the thermoplast.

In addition, the phosphorus may be prestabilized with other metal compounds, for example with from 0.3 to 3% of magnesium oxide, aluminium oxide, lead oxide, zinc oxide, and may contain mould release agents, for example from 0.05 to 1% of paraffin oil or high-boiling esters.

The stabilized, flameproofed polyamides may contain the usual additives and auxiliaries, for example one or more fillers, particularly glass fibers, in quantities of from 10 to 60% by weight, based on the total mixture. Other suitable fillers and reinforcing materials include glass microbeads, chalk, quartzes, for example novaculite, and silicates, such as asbestos, feldspar, mica, talcum, wollastonite and also kaolin in calcined and noncalcined form. The stabilized, flameproofed polyamides may also contain dyes and pigments, particularly pigment blacks and/or nigrosine bases, stabilizers, processing aids and dust-binding agents, also impact strength modifiers, for example based on copolymers of ethylene, poly(meth)-acrylates and grafted polybutadienes.

The thermoplastic moulding compositions are processed in known manner by injection moulding or extrusion. Polyamide mouldings are particularly suitable for use in the electrical and automotive fields and are used, for example, for the production of housings and covers in the field of engineering, particularly in the electrical industry, and for the production of components for electrical domestic appliances and automobiles.

EXAMPLES 1 to 17

A mixture of polyamide-6,6 having a relative viscosity of 2.9, as measured on a 1% solution in m-cresol at 25° C., 10% of red phosphorus (in the form of a 20% concentrate in polyamide-6,6) and the stabilizer is heated with stirring under nitrogen for 30 minutes to 280° C. (bath temperature). In all the tests, the starting mixture has a moisture content of 0.2%.

The hydrogen phosphide formed during the reaction is passed with a stream of nitrogen into a 2% aqueous mercury-II-chloride solution and acidimetrically determined via the hydrogen chloride formed in accordance with the following equation:

$$PH_3 + 3\,Hg\,Cl_2 = P(Hg\,Cl)_3 + H\,Cl$$

In order to determine the water-soluble acids, 35 g of the polyamide heated to 280° C. are extracted with water at 95° C. for 16 hours. The total extract is made up to 200 ml. pH-value and phosphorus content are measured on the resulting solution.

The hydrogen phosphide formed and also the pH-value and phosphorus content of the extract are shown in following Table 1 as a function of the stabilizer content.

The quantity of hydrogen phosphide is based on 50 g of phosphorus-containing polyamide and the quantity of phosphorus in the extract is based on 35 g of polyamide.

cadmium oxide and adipic acid in regard to acid formation.

EXAMPLES 18 to 21

Using a Werner and Pfleiderer type ZSK 83 twin screw extruder (melt temperature 280° C., throughput 50 kg/h), polyamide moulding compositions are produced from a mixture of 50 parts of polyamide-6,6 (relative viscosity 2.9), 25 parts of a 20% phosphorus concentrate in polyamide-6,6 and 25 parts of glass fibers in the presence of various stabilizers and extracted with water as described in Examples 1 to 17. The pH-values and phosphorus contents of the extracts are shown in following Table 2.

TABLE 2

| Example No. | Stabilizer | Quantity (% by weight) | Expressed as CdO (% by weight) | Extract pH-value | Extract phosphorus (mg) |
|---|---|---|---|---|---|
| 18 | cadmium adipate | 1 | 0.5 | 5.1 | 0.2 |
| 19 | cadmium oxalate | 1 | 0.5 | 8.0 | 0.6 |
| 20* | cadmium oxide | 1 | 1 | 8.8 | <0.2 |
| 21* | copper oxide | 1 | | 3.3 | 14.5 |

Comparison of Examples 18 to 19 with Example 20 shows that, to obtain a comparable effect, it is sufficient to use a smaller quantity of cadmium providing it is used in the form of a salt.

We claim:

1. A powder-form red phosphorus stabilized against thermo-oxidative decomposition with at least one cadmium salt of carboxylic acid.

2. A stabilized, powder-form red phosphorus as claimed in claim 1, comprising from 1 to 30% by weight, based on red phosphorus, of the at least one cadmium salt.

3. A stabilized, powder-form red phosphorus as claimed in claim 1, comprising from 3 to 25% by weight, based on red phosphorus, of the at least one

TABLE 1

| Example No. | Stabilizer | Quantity (% by weight) | Expr. as CdO (% by weight) | PH₃ (mg) | Extracts pH-value | Extracts Phosphorus (mg) |
|---|---|---|---|---|---|---|
| 1 | cadmium adipate | 4 | 2 | 0.4 | 5.2 | 0.2 |
| 2 | | 2 | 1 | 1.1 | 5.1 | 0.4 |
| 3 | | 1 | 0.5 | 1.5 | 5.1 | 0.4 |
| 4 | | 0.5 | 0.25 | 1.6 | 5.0 | 0.6 |
| 5 | cadmium oxalate | 3.13 | 2 | 1.6 | 4.6 | 3.1 |
| 6 | | 1.58 | 1 | 1.0 | 4.3 | 1.3 |
| 7 | | 0.78 | 0.5 | 1.2 | 4.0 | 1.3 |
| 8 | cadmium phthalate | 2.1 | 1 | 1.2 | 5.2 | 0.3 |
| 9 | cadmium stearate | 5.3 | 1 | 0.3 | 5.1 | 0.9 |
| 10* | cadmium oxide | 2 | 2 | cannot be detected | 6.3 | 0.8 |
| 11* | | 1 | 1 | cannot be detected | 5.9 | 2.0 |
| 12* | | 0.5 | 0.5 | 1 | 3.9 | 6.3 |
| 13* | | — | — | 4.8 | 3.1 | 12.9 |
| 14* | copper-II-oxide | 1 | | cannot be detected | 2.7 | 26 |
| 15* | cadmium oxide adipic acid | 2 2 | | 2.3 | 5.0 | 0.6 |
| 16* | cadmium oxide adipic acid | 1 1 | | 2.2 | 4.8 | 1.0 |
| 17* | cadmium oxide adipic acid | 0.5 0.5 | | 2.6 | 4.4 | 2.3 |

*Comparison Example

Comparison Examples 10 to 17 illustrate the superiority of the stabilizers according to the invention to cadmium oxide, copper oxide and even to a mixture of cadmium salt.

4. A stabilized, powder-form red phosphorus as claimed in any of claims 1 to 3, wherein the cadmium salt is mixed with the red phosphorus powder.

5. A stabilized powder-form red phosphorus as claimed in any of claims 1 to 3, wherein the cadmium salt is precipitated onto the phosphorus particles.

6. A thermoplastic polyamide moulding composition containing as flame proofing agent a stabilized powder-form red phosphorus as claimed in any of claims 1 to 5.

7. A thermoplastic polyamide moulding composition as claimed in claim 6, containing from 0.01 to 5% by weight, based on the total moulding composition of the cadmium salt.

8. A thermoplastic polyamide moulding composition as claimed in claim 7, containing from 0.05 to 3% by weight, based on the total moulding composition of the cadmium salt.

9. A thermoplastic polyamide moulding composition as claimed in any of claims 6 to 8, wherein the polyamide is polyamide-6 and polyamide-6,6.

10. A thermoplastic moulding composition as clamined in any of claims 6 to 9 wherein the cadmium salt is cadmium oxalate or cadmium adipate.

* * * * *